Oct. 1, 1929.  E. C. HAWKINS  1,730,038
BUTTER MOLD
Filed Aug. 22, 1927  3 Sheets-Sheet 1
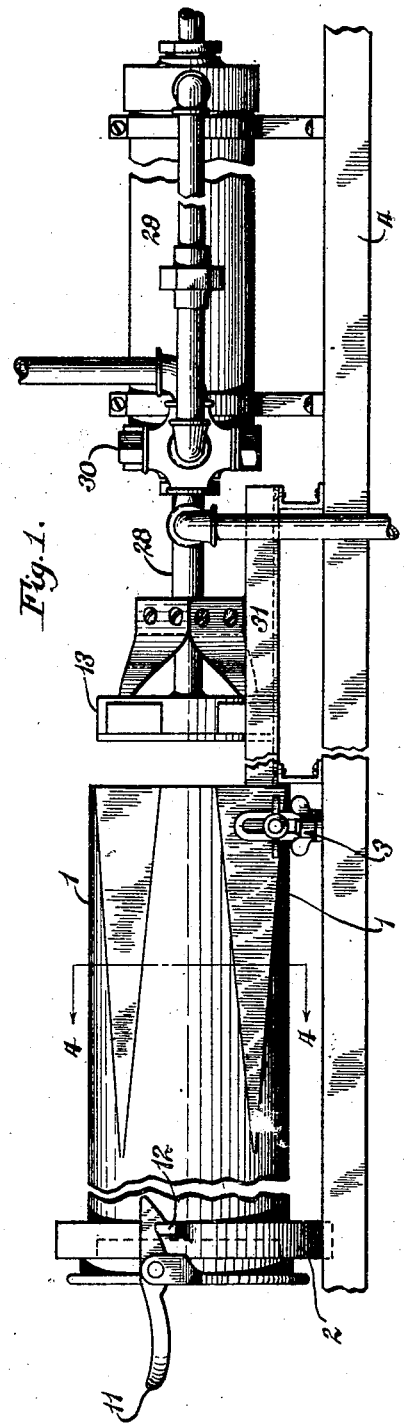
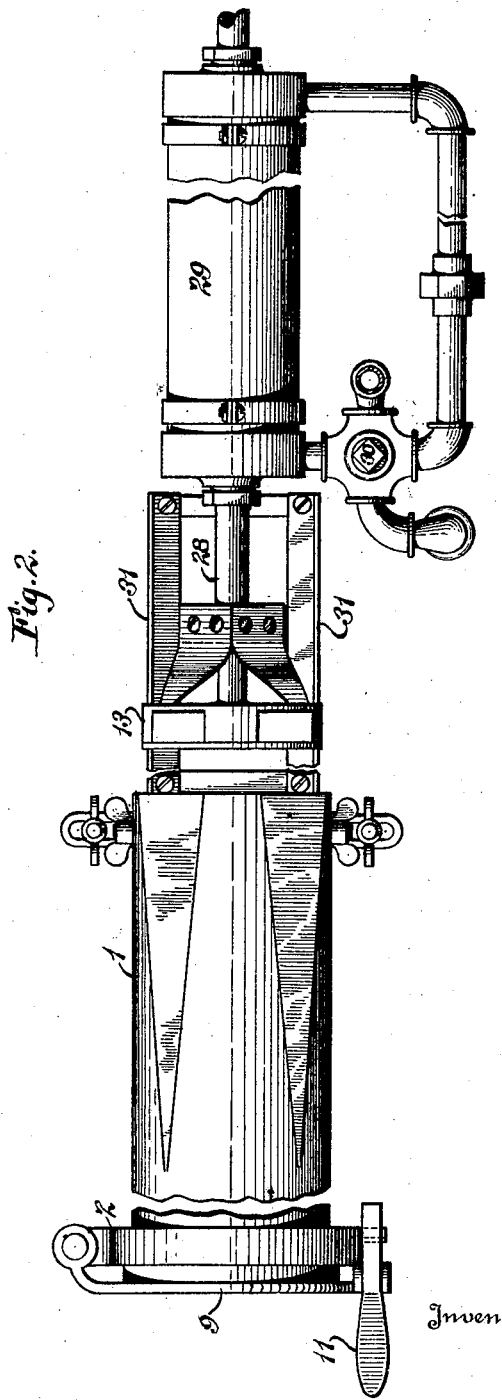
Inventor
Earl C. Hawkins
By Poppam Powers
Attorneys

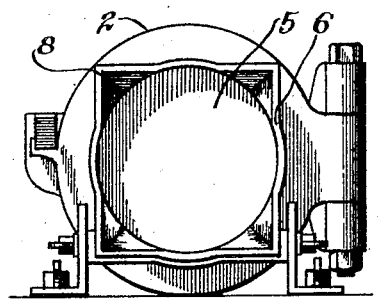
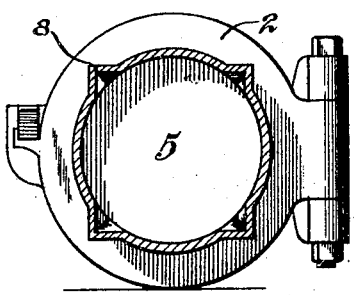
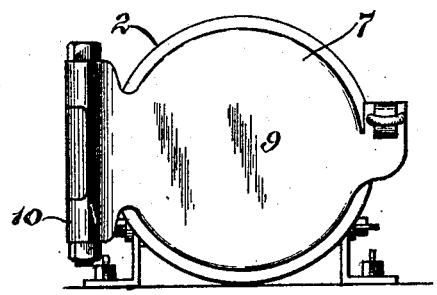
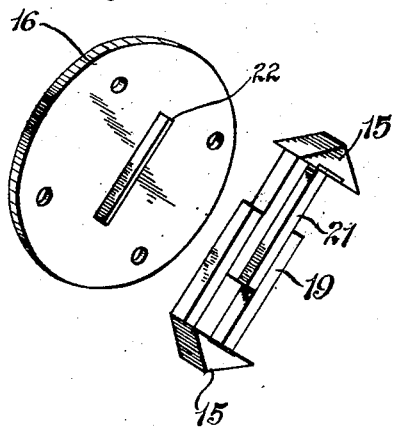
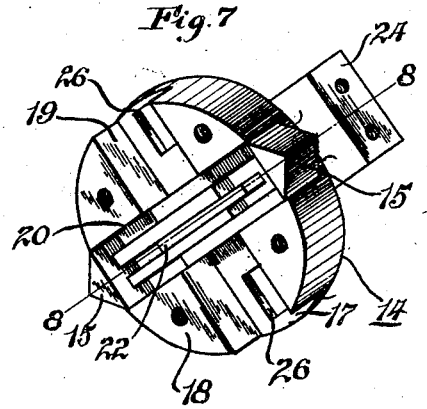

Oct. 1, 1929.  E. C. HAWKINS  1,730,038
BUTTER MOLD
Filed Aug. 22, 1927   3 Sheets-Sheet 3

Inventor
Earl C. Hawkins
By Popp and Powers
Attorney

Patented Oct. 1, 1929

1,730,038

UNITED STATES PATENT OFFICE

EARL C. HAWKINS, OF BUFFALO, NEW YORK

BUTTER MOLD

Application filed August 22, 1927. Serial No. 214,633.

This invention relates to improvements in butter molding machines and proposes an apparatus which is particularly intended for use in connection with the reshaping of butter.

Practically all the butter sold on the market at the present time is put up in rectangular blocks known as standard prints. Some dealers, however, prefer to sell butter put up in the form of cylindrical blocks, commonly termed "country rolls," and such dealers are faced with the problem of reshaping the standard prints into cylindrical form. The reshaping of butter cannot be accomplished in any haphazard manner but, on the contrary, great care must be exercised in reshaping to prevent working or disintegrating it inasmuch as the quality rapidly deteriorates through such working. While reshaping naturally presupposes some disintegration, it has been found that if the disintegration is very slight, the quality of the butter is not noticeably affected.

The object of the present invention is to provide a simple and compact machine which will quickly and economically reshape the butter, while cold, with very little "breaking up" or disintegration and which will produce a "country roll" comparable in every respect to the standard print from which it was obtained.

The means by which the reshaping is accomplished, in its general organization includes a forming casing having a working chamber with a rectangular butter inlet end which merges into a round outlet end and a cooperating plunger having a progressively changeable marginal outline whereby to conform always to the shape of the chamber as it passes through the same.

For a better understanding of the invention, reference will be made to the accompanying drawings, in which:

Figures 1 and 2 are side and plan views respectively of the machine.

Figure 3 is a view in elevation of the inlet end of the forming casing.

Figure 4 is a section along line 4—4 of Figure 1.

Figure 5 is an end view showing the cylinder plug.

Figures 6 and 7 are perspectives of cooperating parts of the plunger head.

Figure 8:
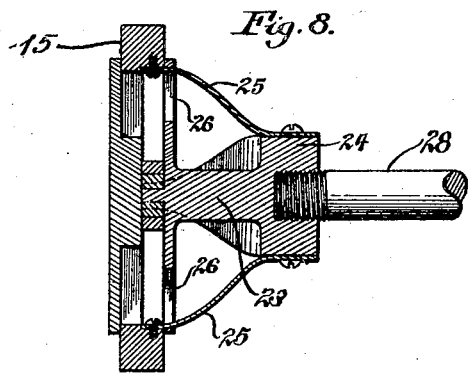
Figure 8 is a longitudinal sectional view along the line 8—8 of Figure 7.
Figure 9:
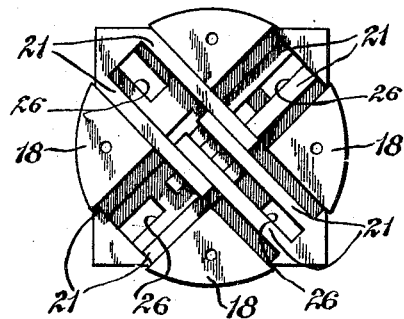
Figure 9 is a perspective of the plunger head with the butter engaging face removed.

The forming casing 1 is supported at one end by a radial flange 2 and at its other end by any conventional supporting means 3 which permits vertical or lateral adjustment of the casing, such supports being secured to a base 4. The casing 1 is fashioned with a longitudinal working or reshaping chamber 5 open at its ends, its inlet end being shown at 6 and its outlet end at 7. The inlet end 6 (Fig. 3) is substantially rectangular, preferably square, and the outlet end 7 (Figure 5) is annular. In order to permit the unobstructed insertion into said chamber of a standard print of butter and to cause its progressive change of shape, the chamber is provided with four symmetrically spaced longitudinal grooves 8, each of V-shaped cross section which form the corners of the substantially square shaped inlet opening 6 and which gradually taper off until lost in the chamber at points suitably located along its length. The length of the chamber from such points to the outlet end 7 provides a sufficient volume to accommodate the butter in its new form. Stated otherwise the chamber between the end 7 and the inner ends of the grooves 8 is cylindrical and of an extent which encompasses that of the reshaped block. During the reshaping operation, the outlet end 7 is closed and for this purpose a door or plug 9 is provided which is pivotally mounted on the radial flange 2 by means of a hinge 10. The door is provided with a latch handle 11 which cooperates with a latch finger 12 extending from the flange 2, to hold the door in closed position.

The butter is forced through the chamber 5 by a plunger 13 which is progressively changeable in marginal outline, from that of a rectangle as when said plunger enters the chamber to that of a disc as when said plunger is at the end of its working stroke. For this purpose the plunger includes a head 14 by which its annular outline is determined and a group of blocks 15 of inverted V-shape, arranged to slide radially relatively to said head through a range of positions between positions of full projection and retraction with respect to the periphery of said head. When the blocks 15 are fully projected the outline of the plunger is substantially square and when they are fully retracted the plunger outline is annular while in intermediate positions the plunger has its marginal outline composed of arcs and intervening external angles.

In order to carry out these characteristics of operation the head 14 is composed of two discs 16 and 17 which are secured to and separated by segmental portions 18, said portions having peripheral faces flush with the perimeters of the discs and spaced from one another to delimit intersecting guideways 19 and 20 for the blocks 15. These are each provided with a pair of guide bars 21 extending from an edge and arranged whereby the bars of one block operate in the space between the bars of the opposed block. The guide bars are but half the thickness of the blocks and those of one pair of opposed blocks are set to extend across those of the other pair; in other words one set of relatively slidable guide bars is arranged in its guideway, e. g. the guideway 19, overlies transversely the other set of guide bars as arranged in the other guideway 20. To assist in centering each set of guide bars, each disc is provided with a projection 22 which is fitted between the inner pair of guide bars. The disc 17 is further provided with an axially located stem 23 which terminates in a flat sided flange 24. The construction of the head is completed by the provision of spring arms 25 which are attached at one end to the flat sides of the flange 24 and which extend through slots 26 in the disc 17, the other ends of said arms bearing against the inner sides of the blocks 15, and being fitted in recesses in the guide bars 21 whereby to permit free outward displacement of the blocks. These arms normally bias the blocks outwardly relatively to the head 16 to a position of full projection as related heretofore.

The flange 24 is suitably connected to the rod 28 of any conventional means illustrated herein as a hydraulic reciprocating engine 29 having a four way control valve 30. To insure the entry of the plunger 13 into the forming chamber, tracks 31 are provided which function as supporting guides for the plunger in its travel to the inlet opening 6.

The apparatus is conditioned for operation by operating the valve 30 to completely withdraw the plunger from the casing and by latching the door or plug 9 in closed position. The end portion of a square print of butter which has been suitably chilled is then inserted in the inlet end 6, the print being otherwise supported on the tracks 31, and valve 30 is then actuated to cause the plunger to move toward and into the forming chamber during which movement it engages and pushes the butter therein. As the plunger travels further into the casing, the taper of the grooves 8 compels the blocks 15 to recede gradually into the plunger head until they are fully retracted, such condition obtaining at the end of the grooves while at the same time the cross section of the print is progressively altered to conform to the cross section of the forming chamber whereby at a period of the working stroke of the plunger the print has been altered to cylindrical cross section. Due to the fact that cold butter is brittle there will be some disintegration or cracking during this travel. Hence in order to obtain a homogeneous roll, the movement of the plunger is sufficiently extended to force the butter against the door with enough pressure to compact the mass. The door is now opened and the roll expelled by a continuation of the movement of the plunger. At this point the operating valve is actuated to withdraw the plunger and the door is again closed to condition the machine for the reshaping of another standard print.

I claim as my invention:

1. In a machine for molding butter the combination of a body provided with a forming chamber progressively varying in cross sectional outline, from its inlet end to a point suitably distant from its outlet end and from such point to said outlet end being of substantially cylindrical cross section, and a plunger movable through said chamber and constructed whereby its marginal outline at any point of said chamber conforms to the cross section of said chamber at such point.

2. In a machine for molding butter the combination of a body provided with a forming chamber progressively varying in cross sectional outline from its inlet end to a point suitably distant from its outlet end and from such point to said outlet end being of substantially cylindrical cross section, a plunger movable through said chamber and constructed whereby its marginal outline at any point of said chamber conforms to the cross section of said chamber at such point and a closure movably mounted adjacent said outlet end.

3. In a machine for molding butter, the combination of a body provided with a molding chamber having in part of its extent a cross section which progressively varies, in the rest of its extent a circular cross section, the part of varying cross section merging into the part of circular cross section, said chamber having inlet and outlet openings at opposite ends, a door adapted to close said outlet opening, a plunger movable through said chamber said plunger having a working stroke in one part of which it forces the butter through the part of varying cross section into the part of circular cross section, in another part of which it cooperates with said door to compact the mass within the chamber and in another part of which it expels said compacted mass from said chamber and means for moving said plunger.

4. In a butter molding machine, the combination of a body provided with a molding chamber having a grooved section which merges into a cylindrical section and a plunger movable through said chamber, said plunger containing a number of radially extending relatively movable projections whereby its marginal outline may be varied to conform to the cross sectional shape of the chamber at every point of the plunger's progress therethrough.

5. In a butter molding machine, the combination of a body provided with a molding chamber having a grooved section which merges into a cylindrical section, said chamber having inlet and outlet openings at opposite ends, a closure adapted to close said outlet opening and a plunger movable through said chamber, said plunger having a head portion formed with a number of radially extending guideways, and projections slidably mounted in said guideways, said projections being resiliently urged outwardly from said head to a position where the resultant marginal outline of said head conforms to the cross section of the chamber at any point.

6. In a butter molding machine, the combination of a body provided with a molding chamber having a grooved section which merges into a cylindrical section, said chamber having inlet and outlet openings at opposite ends, a closure adapted to close said outlet opening and a plunger movable through said chamber, said plunger having a head portion formed with a number of radially extending guideways, and blocks slidably mounted in said guideways for movement between positions of full retraction and projection relative to said head, said blocks being shaped to conform to the grooves of said molding chamber whereby the marginal outline of said head may be varied to conform to the cross section of the chamber at any point.

In testimony whereof I affix my signature.

EARL C. HAWKINS.